(12) United States Patent
Hiller et al.

(10) Patent No.: US 12,505,753 B2
(45) Date of Patent: Dec. 23, 2025

(54) LASER BEAM BASED FLIGHT PATH CLEARING SYSTEM

(71) Applicant: The Boeing Company, Arlington, VA (US)

(72) Inventors: Nathan D. Hiller, Irvine, CA (US); Stephen Lambert, Maryland Heights, MO (US); Todd Harding Tomkinson, Newbury Park, CA (US); Steven Fulton Griffin, Kihei, HI (US)

(73) Assignee: The Boeing Company, Arlington, VA (US)

( * ) Notice: Subject to any disclaimer, the term of this patent is extended or adjusted under 35 U.S.C. 154(b) by 93 days.

(21) Appl. No.: 18/442,984

(22) Filed: Feb. 15, 2024

(65) Prior Publication Data

US 2025/0265937 A1    Aug. 21, 2025

(51) Int. Cl.
| | |
|---|---|
| *G08G 5/80* | (2025.01) |
| *B64D 47/06* | (2006.01) |
| *H01S 3/13* | (2006.01) |
| *G02B 26/08* | (2006.01) |
| *G02B 26/10* | (2006.01) |

(Continued)

(52) U.S. Cl.
CPC .............. *G08G 5/80* (2025.01); *B64D 47/06* (2013.01); *H01S 3/13* (2013.01); *G02B 26/08* (2013.01); *G02B 26/10* (2013.01); *G02F 1/00* (2013.01); *H01S 3/22* (2013.01)

(58) Field of Classification Search
CPC ........ G01S 17/42; G01S 17/46; G01S 17/933; H04B 10/11; H04B 10/1121; H04B 10/503; H04B 10/504
See application file for complete search history.

(56) References Cited

U.S. PATENT DOCUMENTS

| | | | | |
|---|---|---|---|---|
| 5,465,142 A * | 11/1995 | Krumes | ................ | G01S 17/933 359/201.1 |
| 2020/0005656 A1* | 1/2020 | Saunamaeki | .......... | G05D 1/104 |
| 2020/0341117 A1* | 10/2020 | Sandford | ................ | G01S 17/93 |

(Continued)

FOREIGN PATENT DOCUMENTS

| | | | | |
|---|---|---|---|---|
| KR | 20230131378 A | * | 9/2023 | ................ F41J 9/08 |
| WO | WO-2018110788 A1 | * | 6/2018 | ........... F41G 3/2655 |

OTHER PUBLICATIONS

KR-20230131378-A by Woo Soon, English translation version. (Year: 2023).*

(Continued)

*Primary Examiner* — Cuong H Nguyen
(74) *Attorney, Agent, or Firm* — Yee & Associates, P.C.

(57) ABSTRACT

A flight path clearing system comprising a laser beam system in an aircraft and a controller. The controller is configured to select a number of characteristics for a laser beam based on an object type. The controller is configured to control the laser beam system to emit the laser beam with the number of characteristics in a direction relative to a flight path of the aircraft. The controller is configured to control the laser beam system to move the laser beam with the number of characteristics selected for the object type to scan an area using a pattern that is based on a sequence of locations in the pattern being nearest to a center of the area, wherein a number of objects of the object type hit by the laser beam is cleared from the flight path.

20 Claims, 8 Drawing Sheets

(51) Int. Cl.
  *G02F 1/00* (2006.01)
  *H01S 3/22* (2006.01)

(56) References Cited

U.S. PATENT DOCUMENTS

2025/0264611 A1* 8/2025 Hiller .............. G01S 17/95
2025/0266907 A1* 8/2025 Hiller .............. H04B 10/1129

OTHER PUBLICATIONS

Liao, Longwen, Xiaoliang Huang, and Fengyu Xie. "Development status and operation analysis of laser weapon in anti-drone warfare." 2023 IEEE International Conference on Unmanned Systems (ICUS). IEEE, (Year: 2023).*

Dominicus, Jacco. "New generation of counter UAS systems to defeat of low slow and small (LSS) air threats." (Year: 2021).*

Hu, S. G., et al. "Efficiency analysis of intercepting UAV swarm by various air defense methods." Journal of Physics: Conference Series. vol. 2472. No. 1. IOP Publishing, (Year: 2023).*

Satat, Guy, Matthew Tancik, and Ramesh Raskar. "Towards photography through realistic fog." 2018 IEEE International Conference on Computational Photography (ICCP). IEEE, 2018. (Year: 2018).*

Edström, Mårten. "Laser Power Beaming for in-FlightCharging of Unmanned Aerial Vehicles—a Viability Study." (2025).*

Kiehn, Daniel, et al. "Adaptive Wind Field Estimation Using an Empirical Bayesian Approach." Journal of Guidance, Control, and Dynamics 47.11 (2024): 2386-2396. (Year: 2024).*

Zheng, Jianhua, et al. "Review on Security Range Perception Methods and Path-Planning Techniques for Substation Mobile Robots." Energies 17.16 (2024): 4106. (Year: 2024).*

Hiller et al., "Laser Scanning for Spatial Acquisition of a Satellite Receiver," U.S. Appl. No. 18/442,914, filed Feb. 15, 2024, 97 pages.

Hiller et al., "Laser Sensor System With Pattern Scanning," U.S. Appl. No. 18/442,953, filed Feb. 15, 2024, 51 pages.

Bloom et al., Understanding the performance of free-space optics [Invited], Journal of Optical Networking, Jun. 2003, vol. 2, Issue 6, pp. 178-200.

Jia et al., "Improved Target Laser Capture Technology for Hexagonal Honeycomb Scanning," Photonics 2023, May 6, 2023, pp. 1-17, vol. 10, Issue. 5, MDPI, Basel, Switzerland, accessed Dec. 22, 2023, https://www.mdpi.com/2304-6732/10/5/541.

Li et al., Analytical expression and optimization of spatial acquisition for intersatellite optical communications, Optics Express, Jan. 31, 2011, vol. 19, Issue 3, pp. 2381-2390.

Runkel, et al., "An Overview of Raster Scanning for ICF-Class Laser Optics," Boulder Damage Symposium XXXIV: Annual Symposium on Optical materials for High Power Lasers, Oct. 30, 2002, 13 pages, U.S. Department of Energy, accessed Dec. 27, 2023, https://www.osti.gov/servlets/purl/15004028.

Toyoshima et al., Optimum divergence angle of a Gaussian beam wave in the presence of random jitter in free-space laser communication systems, Journal of the Optical Society of America A, Mar. 2002, vol. 19, Issue 3, pp. 567-571.

* cited by examiner

LASER BEAM BASED FLIGHT PATH CLEARING SYSTEM

STATEMENT OF GOVERNMENT SUPPORT

This invention was made with Government support under DFARS 252.227-7038 awarded by the Department of Defense. The government has certain rights in this invention.

CROSS-REFERENCE TO RELATED APPLICATIONS

This application is related to U.S. Patent Application entitled "Laser Scanning For Spatial Acquisition Of A Satellite Receiver," application Ser. No. 18/442,914, and U.S. Patent Application entitled "Laser Sensor System With Pattern Scanning," application Ser. No. 18/442,953, both of which are filed even date hereof, assigned to the same assignee, and incorporated herein by reference in their entirety.

BACKGROUND INFORMATION

1. Field

The present disclosure relates generally to aircraft and in particular, to clearing flight paths for aircraft.

2. Background

In operating commercial airplanes, optimal performance of these airplanes occurs under clean conditions. Having clean aerodynamic surfaces such as wings, fuselage, and other locations are needed to provide a smooth flow of air. Debris, dirt, residue, or other material can disrupt the desired airflow resulting in decreased aerodynamic performance.

One source of decreased aerodynamic performance results from insect residue that occurs from insects impacting the surfaces of an airplane. The insect residue from impacts with flying insects can increase the surface roughness of an airplane including the leading edges of wings, the nose of the aircraft, and other locations.

With respect to the aircraft wings, this type of rough surface can promote an earlier transition from laminar to turbulent airflow. This and other types of airflow disruption increases the drag. As a result, the engines of aircraft work harder to maintain the same speed with the increased drag. The situation results in increased fuel use and decreased fuel efficiency.

Further, this type of insect residue can also interfere with sensors on the exterior of the aircraft. As a result, the accuracy of readings from air speed, angle of attack, and other parameters can be impacted by insect residue.

SUMMARY

An embodiment of the present disclosure provides a flight path clearing system comprising a laser beam system in an aircraft and a controller. The controller is configured to select a number of characteristics for a laser beam based on an object type. The controller is configured to control the laser beam system to emit the laser beam with the number of characteristics in a direction relative to a flight path of the aircraft. The controller is configured to control the laser beam system to move the laser beam with the number of characteristics selected for the object type to scan an area using a pattern that is based on a sequence of locations in the pattern being nearest to a center of the area, wherein an object of the object type hit by the laser beam is cleared from the flight path.

Another embodiment of the present disclosure provides a method for clearing a flight path. A number of characteristics is selected for a laser beam based on an object type. The laser beam emitted from an aircraft with the number of characteristics in a direction relative to a flight path of the aircraft. The laser beam with the number of characteristics selected for the object type is moved to scan an area using a pattern that is based on a sequence of locations in the pattern being nearest to a center of the area, wherein an object of the object type hit by the laser beam is cleared from the flight path.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations as described herein. For example, reduced aerodynamic performance occurs with insect residue on the surface of an aircraft. This insect residue results from flying insects impacting the surface of an aircraft. The illustrative examples also recognize and take into account that unintended impacts with other objects can reduce the performance or cause inconsistencies in the aircraft.

Currently, sensors such as object detection systems can be used to detect birds and insects. With the detection of objects ahead of the aircraft, pilots can take evasive action as needed. These actions, however, may reduce the passenger experience. In other cases, pilots are trained to take action in response to an action impact with insects or birds. It would be desirable, however, to avoid situations where evasive maneuvers or impacts occur.

Thus, a method, apparatus, system, and computer program product for clearing a flight path is provided. In one illustrative example, a flight path clearing system comprises a laser beam system in an aircraft and a controller. The controller is configured to select a number of characteristics for a laser beam based on an object type. The controller is configured to control the laser beam system to emit the laser beam with the number of characteristics in a direction relative to a flight path of the aircraft. The controller is configured to control the laser beam system to move the laser beam with the number of characteristics selected for the object type to scan an area using a pattern that is based on a sequence of locations in the pattern being nearest to a center of the area, wherein an object of the object type hit by the laser beam is cleared from the flight path.

Figure 1:
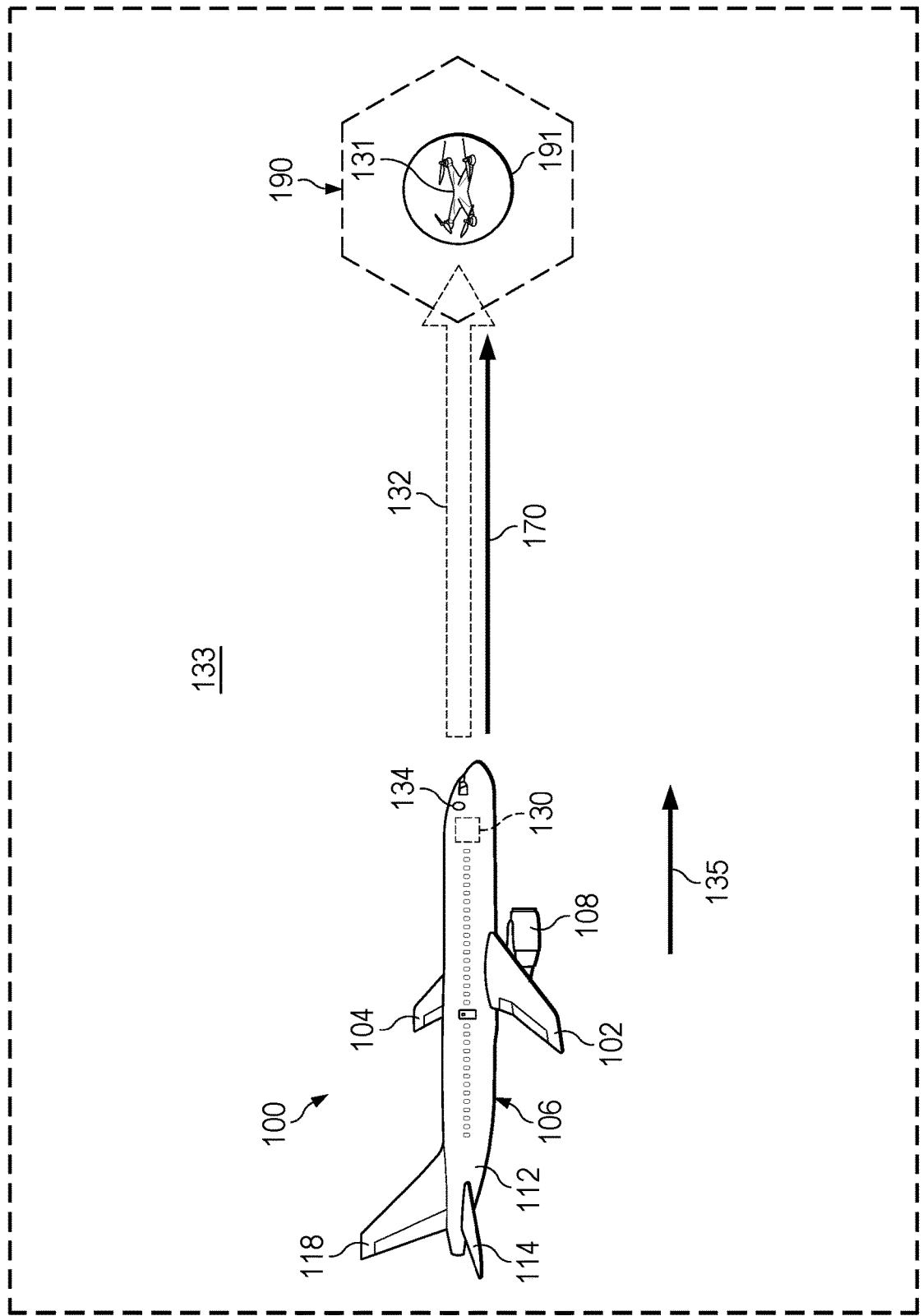
FIG. 1 is an illustration of an aircraft in a turbulent environment in accordance with an illustrative example.

With reference now to the figures and, in particular, with reference to FIG. 1, an illustration of an aircraft in a turbulent environment is depicted in accordance with an illustrative example. In this illustrative example, in aircraft environment 133 commercial airplane 100 has wing 102 and wing 104 attached to body 106. In some examples, body 106 can also be referred to as the fuselage. Engine 108 is attached to wing 102. In this view of commercial airplane 100, another engine is attached to wing 104 but not seen in this view.

Body 106 has tail section 112. Horizontal stabilizer 114 and vertical stabilizer 118 are attached to tail section 112 of body 106. Another horizontal stabilizer is present but not shown in this view.

Commercial airplane 100 is an example of an air vehicle in which flight path clearing system 130 can be implemented in accordance with an illustrative example. In this illustrative example, flight path clearing system 130 scans the environment around commercial airplane 100 to clear objects that may be in the flight path of commercial airplane 100. Further, with the use of flight path clearing system 130, the pilot for an aircraft management system can operate commercial airplane 100 without a need to take evasive maneuvers or take action because of impacts with objects such as drone 131.

In this illustrative example, flight path clearing system 130 operates to emit laser beam 132 from port 134 of commercial airplane 100. As depicted, laser beam 132 is emitted in a forward direction 135 relative to flight path 170 of commercial airplane 100. In this illustrative example, flight path clearing system 130 is operated to move laser beam 132 to scan area 190 ahead of the direction of travel of commercial airplane 100. In this example, area 190 has the shape of a hexagon. The dimensions of area 190 can be based on the wingspan of commercial airplane 100. For example, if the wingspan is 60 meters, the diameter of area 190 can be 60 meters.

By scanning area 190 with laser beam 132, objects such as drone 131 can be cleared from flight path 170 of commercial airplane 100. In this example, laser beam 132 as characteristics suitable for clearing drone 131 from flight path 170. Example, at least one of a wavelength, intensity, power, or other characteristic of laser beam 132 can be selected to cause drone 131 move out of or away from flight path 170. For example, the characteristics can be selected to affect the navigation system or other components of drone 131 such that is unable to maintain altitude or course that is within flight path 170.

In this illustrative example, the scanning of area 190 can be performed by using a pattern based on sequence locations in the pattern being nearest to center 191 of area 190. In this example, the pattern begins around center 191 and moves outward. The sequence of locations does not need to be the nearest neighbor. At least some locations in the sequence are discontinuous from each other in this example.

Further, with the use of flight path clearing system 130, the pilot for an aircraft management system can operate commercial airplane 100 without a need to take evasive maneuvers or take action because of impacts with objects such as drone 131.

FIG. 1 is intended as an example and not as an architectural limitation for the different illustrative examples. For example, laser beam 132 can be embedded from other locations other than port 134 in body 106. In another illustrative example, laser beam 132 can be emitted from a port located in wing 104, horizontal stabilizer 114, vertical stabilizer 118, or other suitable locations.

A number of objects other than drone 131 may be cleared from flight path 170. For example, flight path clearing system 130 can be used to clear objects selected from at least one of a bird, an insect, a weather balloon, or drone from flight path 170.

As used herein, a "number of" when used with reference to items means one or more items. For example, a number of objects is one or more objects.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Figure 2:
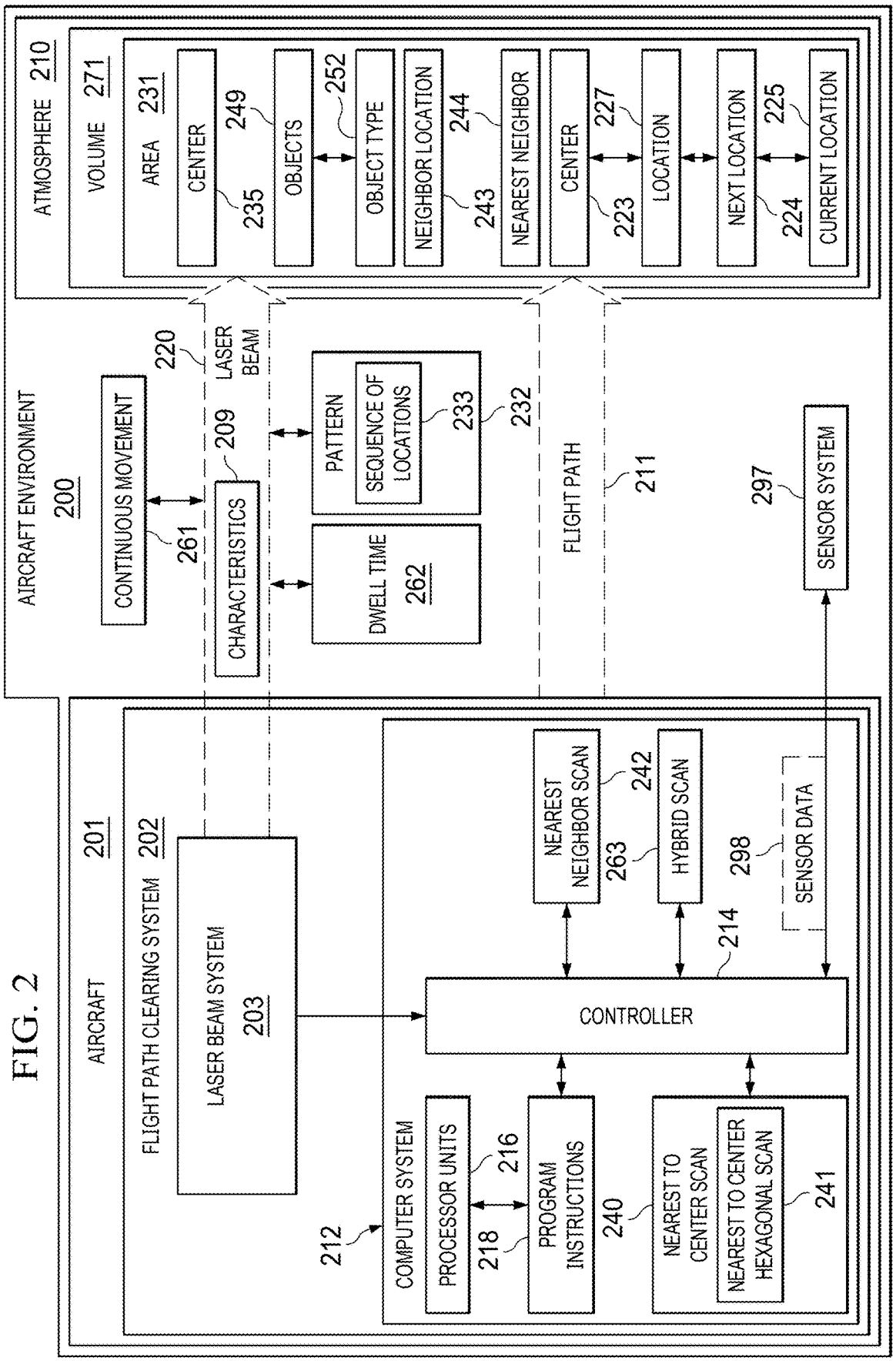
FIG. 2 is an illustration of a block diagram of an aircraft environment in accordance with an illustrative example.

With reference now to FIG. 2, an illustration of a block diagram of an aircraft environment is depicted in accordance with an illustrative example. In this illustrative example, aircraft environment 200 includes components that can be implemented in hardware in an aircraft such as commercial airplane 100 in FIG. 1.

In this illustrative example, flight path clearing system 202 operates to clear objects 249 in atmosphere 210 from flight path 211 on aircraft 201. In this example, flight path clearing system 202 is located in aircraft 201.

Aircraft 201 can take a number of different forms. For example, aircraft 201 can be selected from a group comprising a commercial aircraft, a cargo airplane, a rotorcraft, a fixed wing aircraft, a tilt-rotor aircraft, a tilt wing aircraft, a vertical takeoff and landing aircraft, an electrical vertical takeoff and landing vehicle, a glider, a personal air vehicle, and other types of aircraft that can fly in atmosphere 210.

As depicted, flight path clearing system 202 comprises laser beam system 203, computer system 212, and controller 214. Controller 214 is located in computer system 212. These components are located within aircraft 201 in this illustrative example.

Laser beam system 203 is a hardware system and can include software. Laser beam system 203 can be selected from at least one of a gas laser beam system, a carbon dioxide laser beam system, or other suitable type of laser beams system. In other words, laser beam system 203 can be comprised of multiple different types of laser beams systems.

In this example, laser beam system 203 emits laser beam 220 into atmosphere 210 during flight of aircraft 201. Laser beam 220 is selected from a group comprising a continuous laser beam and a pulsed laser beam. Laser beam 220 can be a type of laser beam selected from a group comprising a $CO_2$ laser beam, an infrared laser beam, a visible light laser beam, and other suitable types of laser beams. Further, laser beam 220 can be linearly polarized.

In this illustrative example, laser beam 220 is emitted by laser beam system 203 in a direction relative to flight path 211 of aircraft 201. In other words, laser beam 220 can be emitted by laser beam system 203 from aircraft 201 in the direction that is relative to flight path 211. By being relative to flight path 211, laser beam 220 does not have to be directly on flight path 211.

For example, controller 214 can control laser beam system 203 to emit laser beam 220 and move laser beam 220 to locations in area 231. Area 231 is an area through which flight path 211 of aircraft 201 extends.

Controller 214 can be implemented in software, hardware, firmware, or a combination thereof. When software is used, the operations performed by controller 214 can be implemented in program instructions configured to run on hardware, such as a processor unit. When firmware is used, the operations performed by controller 214 can be implemented in program instructions and data can be stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, controller 214

In this illustrative example, controller 214 identifies object type 252 for a number of objects 249. This identification can be made using sensor system 297. Sensor system 297 is a hardware system and can include software. Sensor system 297 can be located in aircraft 201 or can be in a remote location. This remote location can be, for example, a ground station, another aircraft, a satellite, or some other location. Sensor system 297 can be at least one of a radar system, a lidar, a camera, a visible light camera, a thermal camera, or some other suitable type of sensor system that can be used to detect objects 249 and obtain sensor data 298 that can be used to determine object type 252.

Sensor system 297 sends sensor data 298 to controller 214. This sensor data can be analyzed by controller 214 to identify object type 252 for the number of objects 249.

Controller 214 identifies a number of characteristics 209 for laser beam 220 based on object type 252 for the number of objects 249. In this illustrative example, the number of characteristics 209 is based on characteristics that can be used to clear the number of objects 249 from flight path 211.

Object type 252 is for objects 259. Each object in objects 259 has an object type. Object type 252 can be from a group comprising an insect, a bird, an aerial drone, and other types of objects that may need to be cleared from flight path 211 of aircraft 201.

The number of characteristics 209 can include at least one of a wavelength, focal length, a power, a timing, an intensity, or other characteristics. In this example, a focal length of laser beam 220 is selected such that laser beam 220 scans area 231 at a distance from aircraft 201 that enables laser beam 220 to effectively clear flight path 211. The distance is such that laser beam 220 can scan area 231 with sufficient time to clear an object from flight path 211 without the object hitting aircraft 201.

One characteristic in the number of characteristics 209 of laser beam 220 has a wavelength selected for absorption by at least one of an insect exoskeleton, a bird feather, a plastic, and a metal. As another example, the wavelength selected is eye-safe for birds. In another example, the timing of laser beam 220 is selected from a group comprising pulsed and continuous.

In this example, controller 214 controls laser beam system 203 to emit laser beam 220 with the number of characteristics 209 in a direction relative to flight path 211 of aircraft 201.

Controller 214 also controls laser beam system 203 to move laser beam 220 with the number of characteristics 209 selected for object type 252 to scan area 231 using pattern 232 that is based on a sequence of locations 233 in pattern 232 being nearest to center 235 of area 231. In one illustrative example, flight path 211 can extend through center 235 of area 231.

A number of objects 249 of the object type 252 hit by laser beam 220 is cleared from flight path 211. The number of objects 249 cleared from flight path 211 may not be directly on flight path 211. These objects may be sufficiently close to flight path 211 that clearing these objects is performed to avoid the number of objects 249 from entering flight path 211 in a manner that can cause an undesired impact or other effect on aircraft 201.

In this illustrative example, pattern 232 can have a number of different shapes. For example, pattern 232 can have a shape selected from a group comprising a hexagon, a honeycomb, a pentagon, an octagon, and other suitable shapes. In this illustrative example, the shapes do not need to be symmetrical and can be irregular.

In moving, laser beam 220 from location to location in sequence of locations 233, controller 214 controls laser beam system 203 to move laser beam 220 from location 227 to next location 224 nearest to center 235 of area 231. In this example, the first location is located at center 235 of area 231.

In this example, next location 224 becomes current location 225 for laser beam 220. This movement of laser beam 220 continues until area 231 has been scanned. The movement from the current location to next location is such that laser beam 220 follows sequence of locations 233 for pattern 232.

This movement of laser beam 220 can be performed using nearest to center scan 240. This type of scan can be faster than moving laser beam 220 between adjacent locations.

For example, controller 214 can move laser beam 220 from current location 225 to next location 224 nearest to center 235 of area 231 from current location 225. This type of scan is nearest to center scan 240. When area 231 has the shape of a hexagon, the scan can be referred to as nearest to center hexagonal scan 241.

Further, controller 214 can control the movement of laser beam 220 to change from nearest to center scan 240 to nearest neighbor scan 242. This type of scan in which the scanning changes from nearest to center scan 240 to nearest neighbor scan 242 is referred to as hybrid scan 263. This change can be made when moving from one location to another location that is adjacent to each other using nearest neighbor scan 242 is faster than moving to a nonadjacent location using nearest to center scan 240.

For example, controller 214 moves laser beam 220 to neighbor location 243 of nearest neighbor 244 in response to the time for moving laser beam 220 from current location 225 to next location 224 using location 227 nearest to center 235 of area 231 being greater than a threshold. These locations are adjacent to each other when using nearest neighbor scan 242.

In this illustrative example, controller 214 can control the movement of laser beam 220 to have at least one of continuous movement 261 or dwell time 262 at each location in sequence of locations 233.

In another example, clearing an aerial drone as the number of objects from flight path 211 comprises causing, at least one of, interference with the navigation system of the aerial drone the aerial drone to fly outside of the flight path of the aircraft, damage to the aerial drone, or destruction of the aerial drone such that the aerial drone moves away from flight path 211 of aircraft 201. In yet another example, objects 249 in the form of birds and inspections can be cleared from flight path 211.

In another example, a controller controls a laser beam system to move a laser beam to scan area 400 using a pattern that comprises a sequence of locations in the pattern that are selected based on a scan metric. The movement does not need to be based on being nearest to center 235 of area 231.

The illustration of aircraft environment 200 in FIG. 2 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, the scan of area 231 can be performed using a scan other than nearest to center scan 240. For example, controller 214 controls laser beam system 203 to move laser beam 220 to scan area 231 using a pattern 232 that comprises sequence of locations 233 in pattern 232 that is selected based on a scan metric. The controller 214 moves laser beam 220 from location 227 to next location 224 in sequence of locations 233 using the scan metric. Next location 224 becomes current location 225 for laser beam 220. The movement of laser beam 220 from current location 225 to next location 224 continues until area 231 has been scanned.

Controller 214 selects next location 224 in area 231 from a set of candidate locations that has a highest value for the scan metric. The scan metric is as follows:

$$M = \text{PDF}_{int}/t_{tot}$$

where $\text{PDF}_{int}$ is a probability density function integrated over an area of interest for a next potential location and $t_{tot}$ is a total time $t_{tot} = t_{slew} + t_{dwell}$, $t_{slew}$ is a time to slew a line-of-sight from the current location to the next potential location, and $t_{dwell}$ is a time the line-of-sight dwells at the next potential location. This process can be repeated to select the sequence of locations for the pattern.

Figure 3:
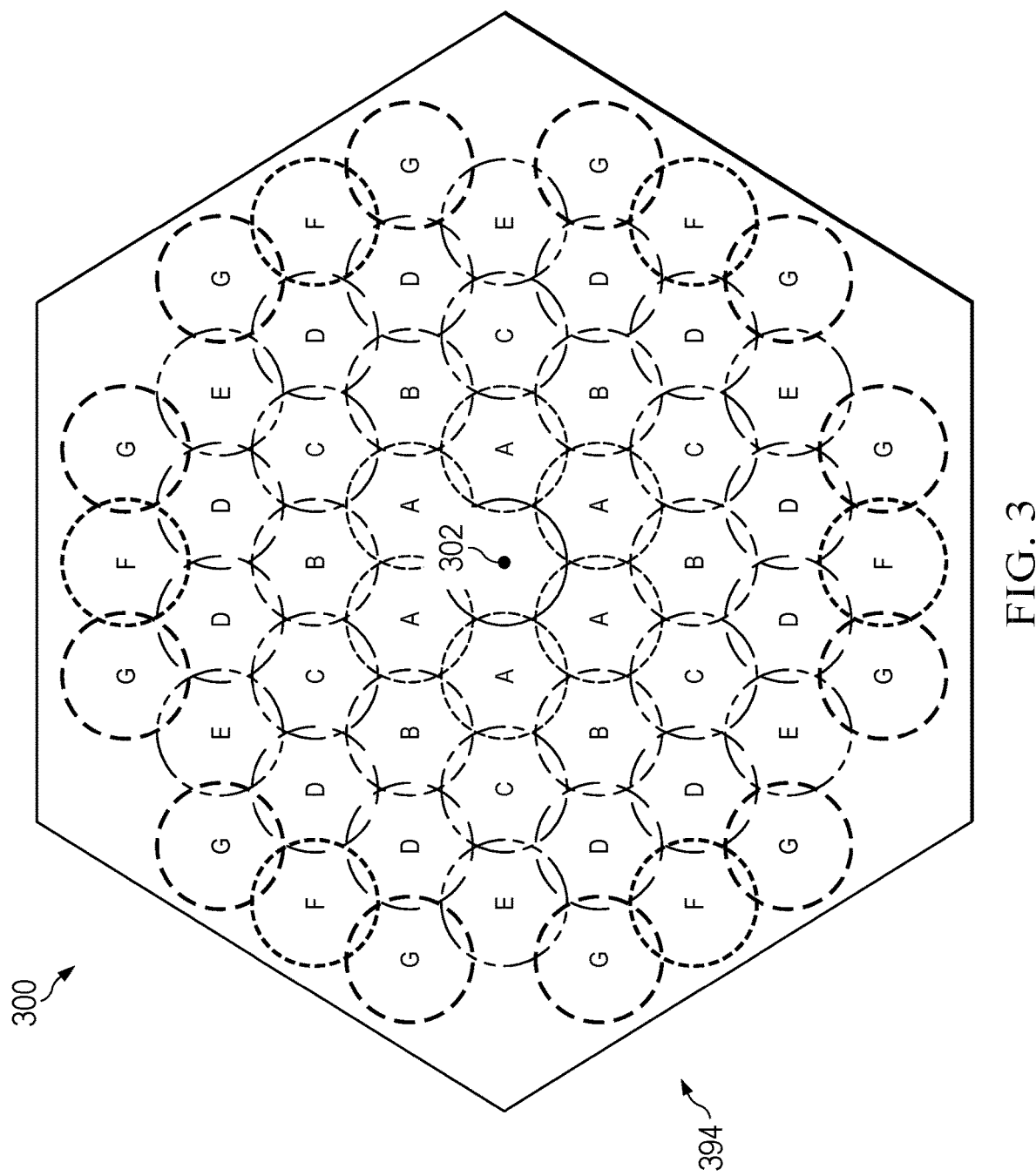
FIG. 3 is an illustration of a sequence of locations in a pattern in accordance with an illustrative example.

With reference now to FIG. 3, an illustration of a sequence of locations in a pattern is depicted in accordance with an illustrative example. In this example, sequence of locations 304 for a pattern are depicted within area 300. This area is an example of area 190 in FIG. 1 and area 231 in FIG. 2. As depicted, area 300 has a hexagonal shape. Sequence of locations 304 is an example of sequence of locations 233 in FIG. 2.

In this example, locations in this sequence can be selected to be the nearest to center 302 of area 300. For example, the first location can be the location for center 302. The next locations closest to center 302 are locations A.

Locations selected that are closest to center 302 after locations A are locations B. The next locations used for pointing laser beams are locations C. The next locations closest to center 302 are locations Ds with locations E being the next locations closest to the center after locations D. The next locations closest to center 302 are locations F followed by locations G.

Figure 4:
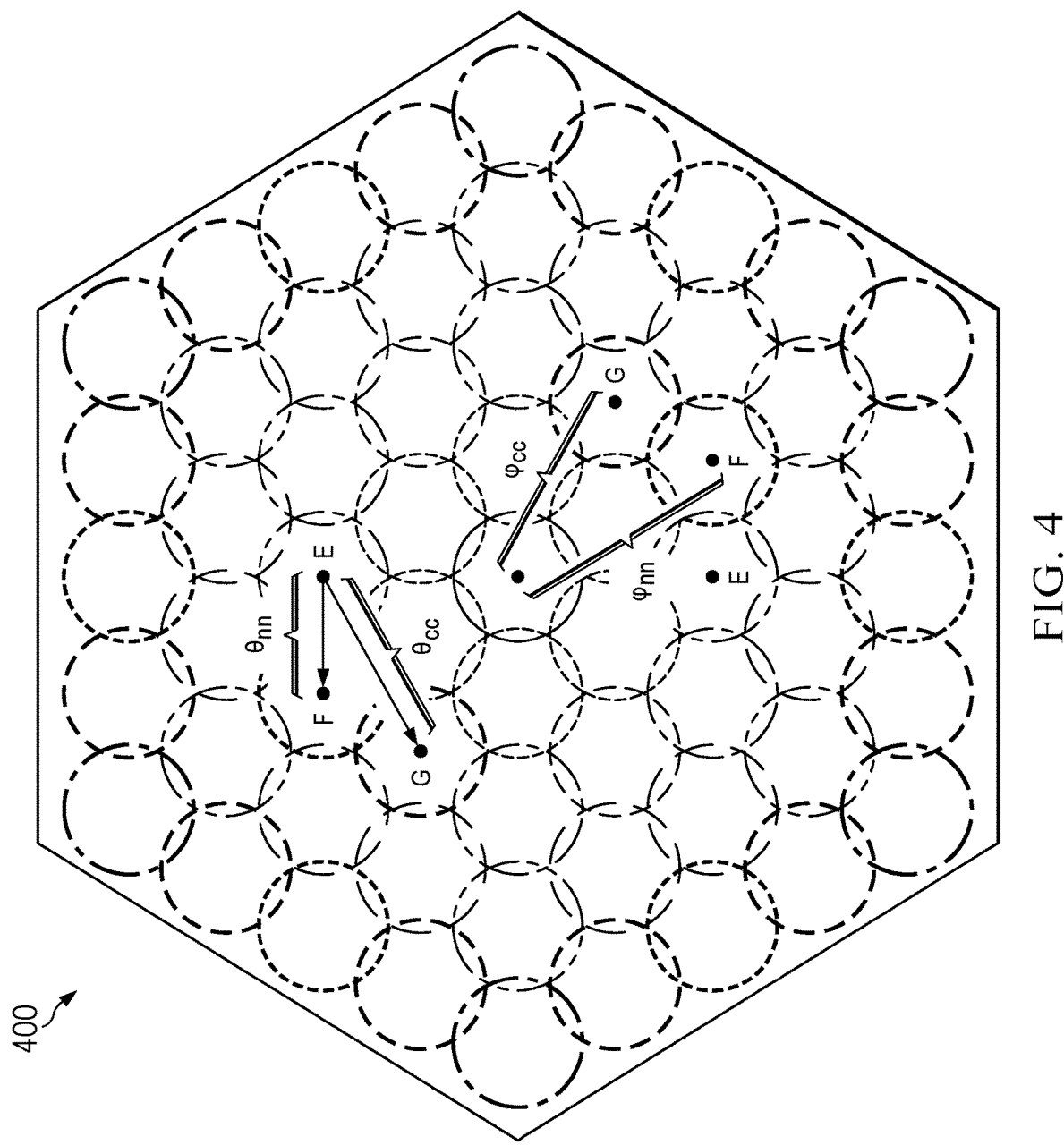
FIG. 4 is an illustration of locations for beam spots and angles between beam spots in accordance with an illustrative example.

Turning to FIG. 4, an illustration of locations for beam spots and angles between beam spots is depicted in accordance with an illustrative example. In this example, a scan for directing a laser beam at beam spots in a pattern in area 400 can be performed using a nearest to center scan. The pattern includes the location of beam spots as well as an order in which a laser beam is directed to the different beam spots. This order can be sequence of locations 233 in FIG. 2 for pattern 232. This pattern can also be referred to as a beam spot pattern. In this example, the locations of these beam spots can be selected as being nearest to center 401 of area 400.

In this example, a scan for directing a laser beam at beam spots in a pattern can be performed using a nearest to center scan. A beam spot is the region that the laser beam hits in area 400. In this example, a beam spot can be the same or about the same size and dimensions as a location. The pattern includes the location of beam spots as well as an order in which the laser beam is directed to the different beam spots. This pattern can also be referred to as a beam spot pattern.

As depicted, angle $\theta_{cc}$ is between beam spot E and beam spot G, and angle $\theta_{nn}$ is between beam spot E and beam spot F. Also shown is angle $\varphi_{cc}$ between the center and beam spot G and angle $\varphi_{nn}$ is between the center and beam spot F. These angles can be used in determining a pattern of beam spots for pointing a laser beam.

In this example, the beam spot pattern can be determined using a nearest to center scan. For a given beam spot pattern, the following equation can be used:

$$t_{net\,savings} \approx \frac{t_{scan}}{N}[PDF(\varphi_{cc}) - PDF(\varphi_{nn})] - \frac{\theta_{cc} - \theta_{nn}}{\text{slew rate}} \quad \text{Equation A}$$

where $t_{net\,savings}$ is the time saved for a single jump from beam spot to beam spot using the nearest to center scan relative to the nearest neighbor scan. In other words, this variable is the time it takes for a single jump from one beam spot to another beam spot using the nearest to center scan approach minus the time it takes for a single jump from beam spot to beam spot using the nearest neighbor scan to determine the beam spot pattern.

$t_{scan}$ is the total scan time to use the nearest neighbor scan.
N is the total number of beam spots in the scan pattern.
PDF($\varphi_{cc}$) is a unitless value of the probability density function for the beam spot that was moved to for the nearest to center scan. This value is a function of distance from the beam spot to the center of the probability density function, which is equivalent to an angle defined as "$\varphi$".
PDF($\varphi_{nn}$) is the unitless value of the probability density function for the beam spot that was moved to for the nearest neighbor scan.
$\theta_{cc}$ is the angular separation between two beam spots when jumping from beam spot to beam spot using the nearest to center scan. The units can be degrees or radians.
$\theta_{nn}$ is the angular separation between two beam spots when jumping from beam spot to beam spot using the nearest neighbor scan.
slew rate is the speed at which the gimble moves. The units are angular change over time I (e.g., degree/s or rad/s).

Example 1

In this example, the slew rate is infinite. This infinite slew rate means the laser beam instantly jumps from beam spot to beam spot. In this case Equation A becomes:

$$t_{net\,savings} \approx \frac{t_{scan}}{N}[PDF(\varphi_{cc}) - PDF(\varphi_{nn})] - \frac{\theta_{cc} - \theta_{nn}}{\infty} = \frac{t_{scan}}{N}[PDF(\varphi_{cc}) - PDF(\varphi_{nn})]$$

Since PDF($\varphi_{cc}$)cc)≥PDF($\varphi_{nn}$), $t_{net\,savings}$≥0, there is never a need to switch from the closest to center scan to the nearest neighbor scan for determining the beam spot pattern.

Example 2

In this example, the slew rate can be considered zero resulting in the following:

$$t_{net\,savings} \approx \frac{t_{scan}}{N}[PDF(\varphi_{cc}) - PDF(\varphi_{nn})] - \frac{\theta_{cc} - \theta_{nn}}{0} = -\infty$$

In this case, the nearest to center scan is not needed because the $t_{net\,savings}$<0.

Example 3

Example 1 showed that if the slew rate is sufficiently fast, it always saves time to use the nearest to center scan to determine a beam spot pattern. Example 2 shows that if the slew rate is sufficiently slow, no time savings is present. In this example, the nearest neighbor scan is used.

If the slew rate is something in-between these extremes, initially, time savings are present using the nearest to center scan.

Figure 5:
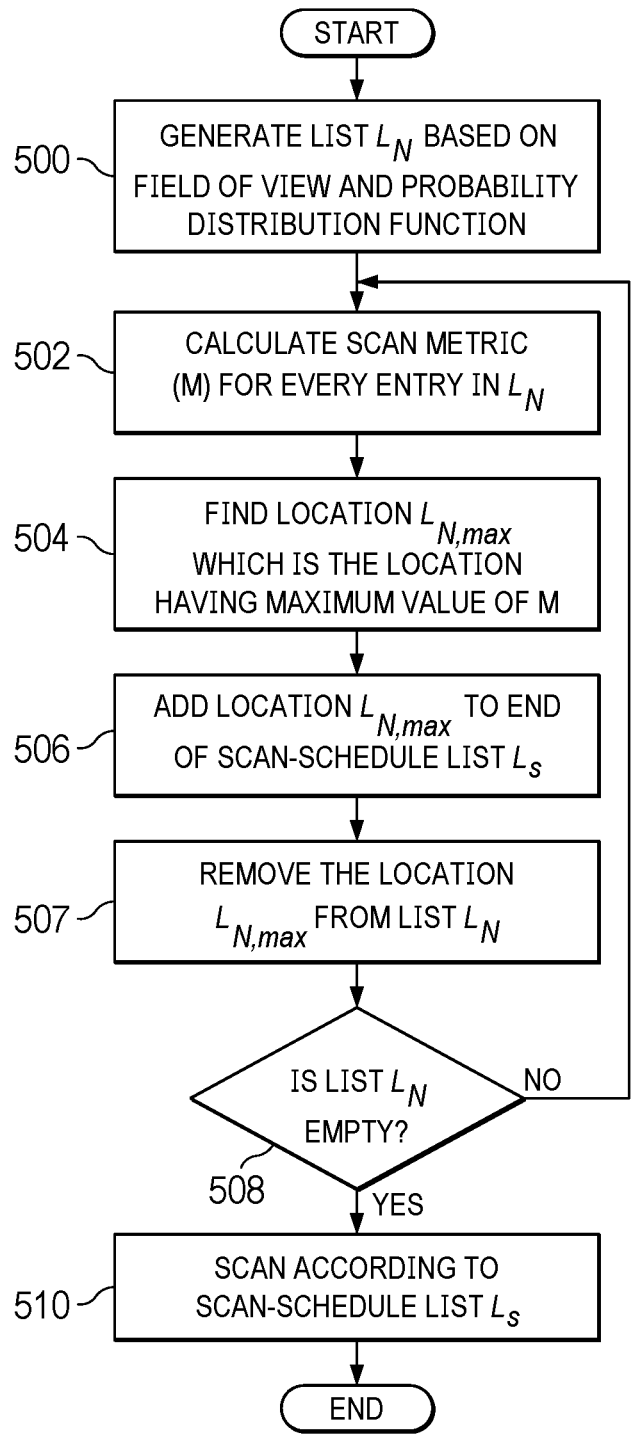
FIG. 5 is an illustration of a flowchart of a process for identifying locations for scanning an area in accordance with an illustrative example.

With reference next to FIG. 5, an illustration of a flowchart of a process for identifying locations for scanning an area in accordance with an illustrative example is depicted. The process in FIG. 5 can be implemented in hardware, software, or both. When implemented in software, the process can take the form of program instructions that are run by one or more processor units located in one or more hardware devices in one or more computer systems. This process can be implemented to identify locations in a sequence of locations in a pattern for scanning an area. For example, the process can be implemented in controller 214 in computer system 212 in FIG. 2.

The process begins by generating a list $L_N$ of all possible locations for the next scan step (operation 500). In operation 500, the possible locations are potential next locations for scanning. The process calculates a scan metric (M) for every entry in the list ($L_N$) (operation 502).

In operation 502, the scan metric is as follows:

$$M = PDF_{int}/t_{tot}$$

where $PDF_{int}$ is the probability density function (PDF) integrated over an area of interest (AOI) for the next potential dwell location. The probability density function shows probability that an object is in a particular location in the area being scanned. In this example, the probability density function can be based on the estimated location of an object when the actual location of the object is unknown. So, probability density function can also take into account uncertainty in errors in estimating the position of the object.

The probability density function can be, for example, a Gaussian function, analytical distribution, a skewed distribution, or other type of probability density function. In this example, the center is the peak of the probability density function when the probability density function has a single peak. In another example, the maximum probability density function can be used when the maximum is not the center of the probability density function.

The area of interest for pointing a laser beam is the region over which the laser beam exceeds a threshold. For example, the area of interest is for a region over which the laser beam has characteristics at a level that clears an object from the flight path. The characteristics can be, for example, power, intensity, wavelength, and other suitable characteristics.

In this example, the total time, $t_{tot}$, is given by $t_{tot}=t_{slew}+t_{dwell}$, where $t_{slew}$ is the time it takes to slew the line-of-sight (LOS) from the current dwell location to the next potential location, and $t_{dwell}$ is the time the line-of-sight dwells at the next potential location. After the dwell at the current location, that dwell location is removed from the list of next possible dwell locations, and the process is repeated until there are no remaining possible dwell locations. The line-of-sight can be the center of spot for the laser beam is moved to point the laser beam at different locations.

The process finds location $L_{N,max}$, which is the location having maximum value of M (operation 504). In operation 504, the location $L_{N,max}$ is the location in the list $L_N$ with the maximum value for M. The system adds the location $L_{N,max}$ to the end of scan-schedule list $L_S$ (operation 506). In operation 506, the scan-schedule list $L_S$ is a scan-schedule list that saves an optimal order of scan steps to use in moving the laser beam to different locations.

The process then removes the location $L_{N,max}$ from list $L_N$ (operation 507). The process determines whether the list $L_N$ is empty (operation 508). In operation 508, if list $L_N$ is not empty, the process returns to operation 502. Otherwise, the process proceeds to scan according to the scan-schedule list $L_S$ (operation 510) with the process terminating thereafter. Thus, this process generates a sequence of locations for a pattern to scan the area.

Figure 6:
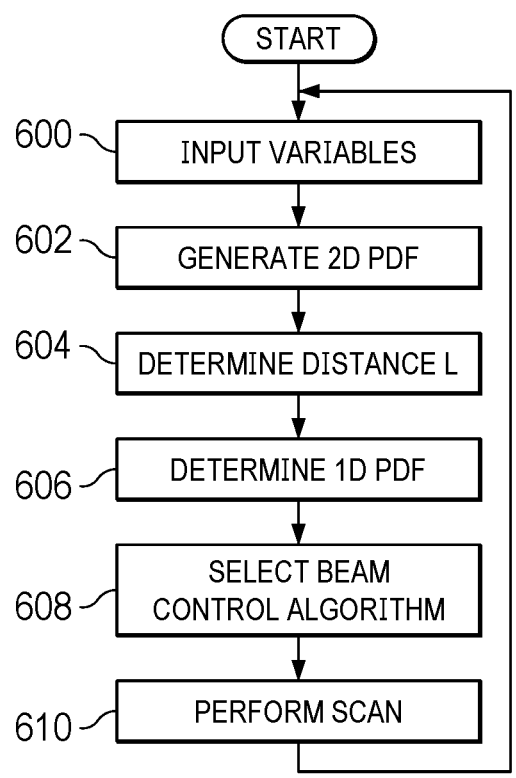
FIG. 6 is an illustration of a flowchart of a process for identifying locations for scanning an area in accordance with an illustrative example.

With reference next to FIG. 6, an illustration of a flowchart of a process for identifying locations for scanning an area is depicted in accordance with an illustrative example. The process in FIG. 6 can be implemented in hardware, software, or both. When implemented in software, the process can take the form of program instructions that are run by one or more processor units located in one or more hardware devices in one or more computer systems. This process can be implemented to a probability density function for use in determining a sequence of locations in a pattern for scanning an area. This process can be implemented in controller 214 in computer system 212 in FIG. 2.

Insects, birds, aerial drones and other objects present a hazard for commercial aircraft. An aircraft can clear a flight path for the aircraft by emitting a laser beam into the flight path. The process in this flowchart can be used to perform the scan for clearing the flight path.

With respect to aerial drones, clearing a flight path of an aerial drone can involve the laser beam heating or melting one or more components of the aerial drone reducing the ability of the aerial drone to fly or navigate, and therefore causing the aerial drone to fly or fall away from the flight path of aircraft.

The process begins by inputting variables (operation 600). In operation 600, these variables are used to generate a probability density function. In this example, with respect to acquiring a flight path, the conditions include aircraft speed, estimated object speed, and crosswind.

The process then generates a two-dimensional probability density function (2D PDF) (operation 602). In this example, the two-dimensional probability density function is comprised of multiple one-dimensional problem density functions. A one-dimensional probability density function is for an area in a plane. Additional one-dimensional probability density functions are generated for additional areas on other planes parallel to the first plane.

The process determines a distance from the aircraft (operation 604). In operation 604, effective distance is the distance at which a laser beam is focused to scan an area in a sequence of locations in a pattern. In these examples, the distance for focusing a laser beam to scan an area is selected as an effective distance that enables the laser beam to effectively clear an object from the flight path of an aircraft.

The effective distance can be selected based on factors such as the ability to scan the area and the effectiveness of the laser beam in clearing an object. As the distance decreases, the amount of time to scan the area before encountering an object decreases and the effectiveness of the laser beam increases. The power or intensity of the laser beam at shorter distances is greater than at longer distances. Thus, the effective distance to effectively clear an object from the flight path of an aircraft is a distance that provides the ability to clear an object from the flight path of the aircraft while having sufficient time to scan an area for the object without the aircraft encountering the object. In these examples, more than one distance can be considered an effective distance for scanning in an area.

The process then determines the one-dimensional probability density function (1D PDF) (operation 606). In operation 606, a single probability density function is selected from the multiple problems involving density functions determined in operation 602. In this example, the probability density function is selected as the one closest to the distance determined in operation 604.

The process then selects a beam control algorithm (operation 608). This beam control algorithm can be, for example, a nearest to center scan, a hybrid scan, a scan based on a scan metric, and other types of scans. The process then performs the scan using the selected algorithm (operation 610). The process then returns to operation 600 and repeats the process. These operations can be performed any number of times to during the flight of aircraft to scan the area ahead of the aircraft.

Several variables can be used in the process for clearing the flight path of an aircraft. The first variable is the probability that the object will collide with the aircraft. If the object is far from the aircraft's flight path, but close to the aircraft, there may not be enough time for the aerial drone to collide with the aircraft. As a result, a low probability of collision is present in this example. If the object is far from the aircraft's flight path, and far from the aircraft, there may be enough time for the aerial drone to collide with the aircraft. In this situation a moderate probability of collision is present. If the object is close to the aircraft's flight path, and close to the aircraft, the time for the aerial drone to move out of the flight path of the aircraft may not be sufficient. In this example, a high probability of collision is present.

Since the location of the object is unknown, the probability of collision is described as a two-dimensional Gaussian shaped probability density function (PDF), where one axis represents the radial distance perpendicular to the flight path (R), and the other axis represents the distance parallel to the flight path and forward from the aircraft (L). Mathematically, this equates to $PDF_{2D}=f(R, L)$. If a cross-wind is not present for the aircraft, the peak of this probability density function is the center of the flight path (i.e., $R_{effetive}=0$). Thus, in these examples, the center of the probability density function can shift to take into account a crosswind.

As for the distance at which to focus the laser beam, two approaches can be used in this illustrative example. In a first approach, physical limitations are considered. The amount of time to scan a laser beam to hit an object that is located very close to the aircraft may be insufficient. Also, the beam power or irradiance may be too low to heat an object far from the aircraft.

An effective distance at which the beam should be focused is indicated by $L_{eff}$.

Atmospheric conditions can also play a role in determining this distance. Atmospheric conditions may affect laser beam attenuation. These conditions include, for example, clouds, fog, rain, dust, and other conditions that may change the attenuation of a laser beam traveling through the atmosphere.

In the second approach, the probability of collision (PC) is determined at every distance in front of the aircraft by integrating the $PDF_{2D}$ at each of these locations, then taking the derivative of the result, setting it to zero, and solving for L to find the plane with the highest probability of collision. The probability of collision in a plane located at a distance L can be expressed as follows:

$$PC(L) = \int_0^\infty PDF_{2D}(r,L) dr$$

and the location of plane having the greatest probability of collision (i.e., $L_{max}$) and the plane's probability of collision can be found by:

$$0 = \frac{d}{dL}[PC(L)] \rightarrow L_{max} \rightarrow PD_{1D}(r, L_{max})$$

If $L_{max}$ is a distance given the laser beam characteristics and atmospheric conditions that enables the laser beam to effectively clear objects in the area from the flight path, the beam is focused to $L_{max}$.

Regardless of the location $L_{effective}$ and the shape of the probability density function, the aircraft emits a laser beam that moves the spot from location to location in a sequence of locations in a hexagonal pattern in this example. Also in this example, the laser beam dwells at each location.

In this example, the first location is located at the center of the probability density function. The location of following spots in the hexagonal pattern is determined by an algorithm that takes into account the probability that the object is located at a particular spot and the time it takes the beam to shift to that particular spot (i.e., slew time).

Once the scan pattern is complete, the path is likely clear. However, the path could soon be reoccupied a short time later (e.g., minutes). Thus, the process in FIG. 6 can be repeated.

Figure 7:
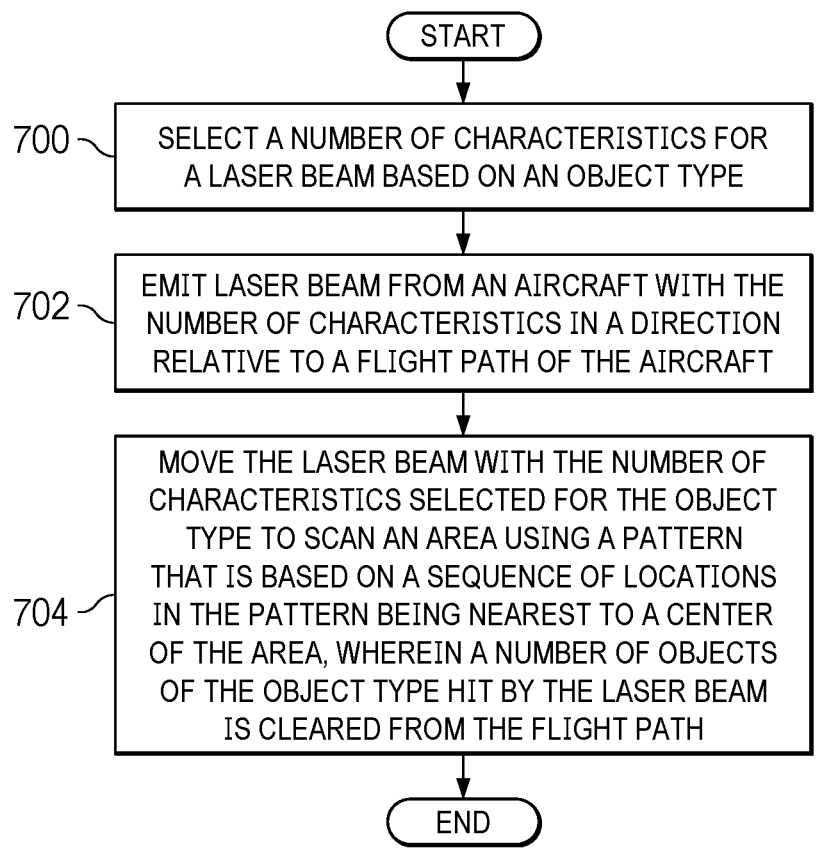
FIG. 7 is an illustration of a flowchart of a process for clearing a flight path in accordance with an illustrative example.

With reference next to FIG. 7, an illustration of a flowchart of a process for clearing a flight path is depicted in accordance with an illustrative example.

The process in FIG. 7 can be implemented in hardware, software, or both. When implemented in software, the process can take the form of program instructions that are run by one of more processor units located in one or more hardware devices in one or more computer systems. This process can be implemented to identify locations in a sequence of locations in a pattern for scanning an area. For example, the process can be implemented in controller 214 in computer system 212 in FIG. 2.

The process begins by selecting a number of characteristics for a laser beam based on an object type (operation 700). The process emits a laser beam from an aircraft with the number of characteristics in a direction relative to a flight path of the aircraft (operation 702).

The process moves the laser beam with the number of characteristics selected for the object type to scan an area using a pattern that is based on a sequence of locations in the pattern being nearest to a center of the area, wherein a number of objects of the object type hit by the laser beam is cleared from the flight path (operation 704). The process terminates thereafter.

The flowcharts and block diagrams in the different depicted embodiments illustrate the architecture, functionality, and operation of some possible implementations of apparatuses and methods in an illustrative example. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
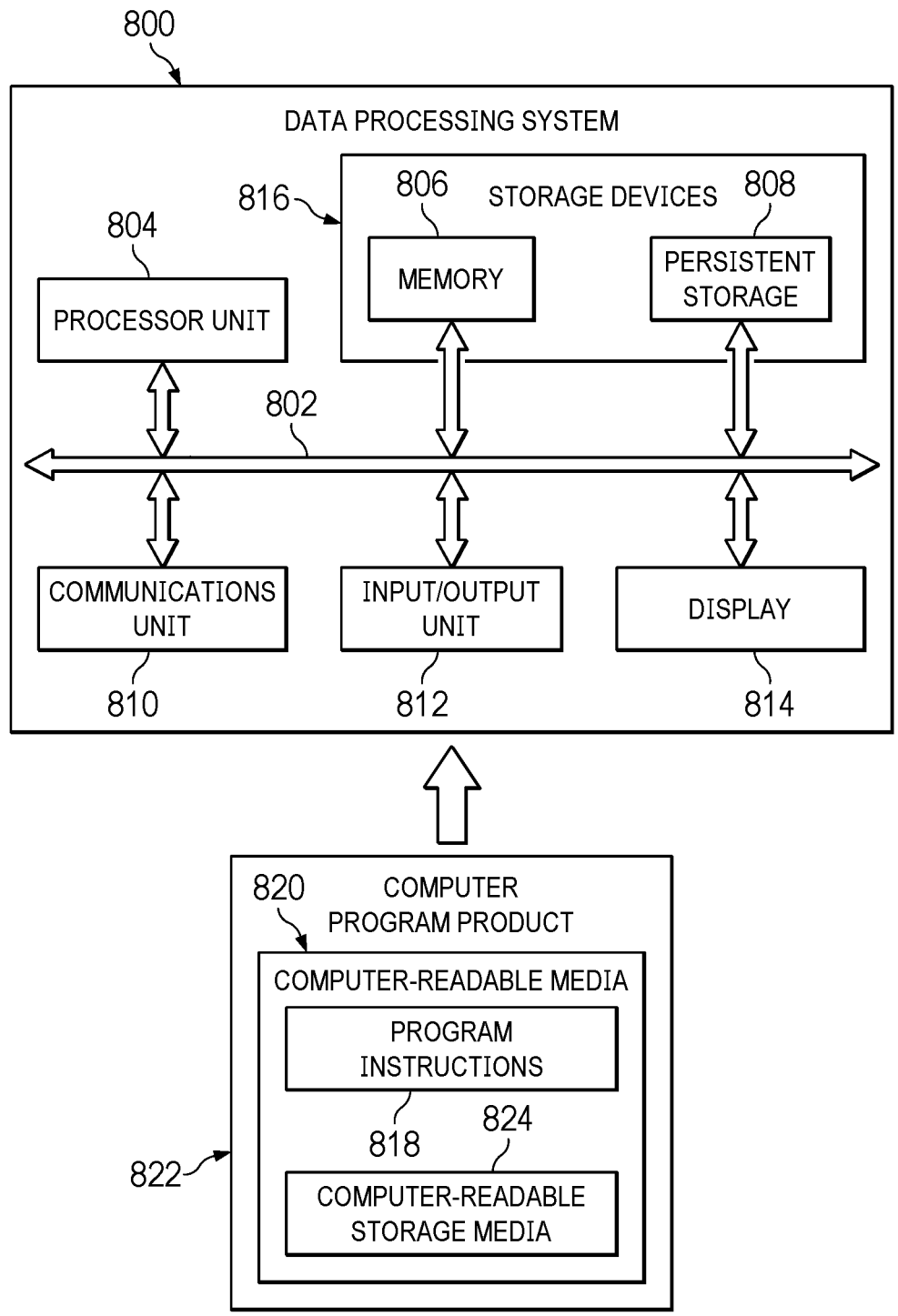
FIG. 8 is an illustration of a block diagram of a data processing system in accordance with an illustrative example.

Turning now to FIG. 8, an illustration of a block diagram of a data processing system is depicted in accordance with an illustrative example. Data processing system 800 can be used to implement computer system 212 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 804 can be implemented using one or more heterogeneous processor systems in which a main processor is present with secondary processors on a single chip. As another illustrative example, processor unit 804 can be a symmetric multiprocessor system containing multiple processors of the same type on a single chip.

Memory 806 and persistent storage 808 are examples of storage devices 816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device.

Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program instructions, computer usable program instructions, or computer-readable program instructions that can be read and executed by a processor in processor unit 804. The program instructions in the different embodiments can be embodied on different physical or computer-readable storage media, such as memory 806 or persistent storage 808.

Program instructions 818 are located in a functional form on computer-readable media 820 that is selectively removable and can be loaded onto or transferred to data processing system 800 for execution by processor unit 804. Program instructions 818 and computer-readable media 820 form computer program product 822 in these illustrative examples. In the illustrative example, computer-readable media 820 is computer-readable storage media 824.

Computer-readable storage media 824 is a physical or tangible storage device used to store program instructions 818 rather than a medium that propagates or transmits program instructions 818. Computer-readable storage media 824 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 824, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 818 can be transferred to data processing system 800 using a computer-readable signal media. The computer-readable signal media are signals and can be, for example, a propagated data signal containing program instructions 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program instructions 818 can be located in computer-readable media 820 in the form of a single storage device or system. In another example, program instructions 818 can be located in computer-readable media 820 that is distributed in multiple data processing systems. In other words, some instructions in program instructions 818 can be located in one data processing system while other instructions in program instructions 818 can be located in one data processing system. For example, a portion of program instructions 818 can be located in computer-readable media 820 in a server computer while another portion of program instructions 818 can be located in computer-readable media 820 located in a set of client computers.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative examples can be implemented in a data processing system including components in addition to or in place of those illustrated for data processing system 800. Other components shown in FIG. 8 can be varied from the illustrative examples shown. The different embodiments can be implemented using any hardware device or system capable of running program instructions 818.

The description of the different illustrative examples has been presented for purposes of illustration and description and is not intended to be exhaustive or limited to the embodiments in the form disclosed. The different illustrative examples describe components that perform actions or operations. In an illustrative example, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative examples may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A flight path clearing system that comprises:
a laser beam system in an aircraft; and
a controller configured to:
select a number of characteristics for a laser beam based on an object type; and control the laser beam system to:
emit the laser beam with the number of characteristics in a direction relative to a flight path of the aircraft; and
move the laser beam with the number of characteristics selected for the object type to scan an area using a pattern that is based on:
a sequence of locations in the pattern being selected from a group that consists of the sequence of locations being:
nearest to a center of the area, wherein a number of objects of the object type hit by the laser beam is cleared from the flight path; and
a scan metric, wherein a number of objects of the object type hit by the laser beam is cleared from the flight path, wherein the scan metric is $M = PDF_{int}/t_{tot}$, where $PDF_{int}$ is a probability density function integrated over an area of interest for a next potential location and $t_{tot}$ is a total time $t_{tot} = t_{slew} + t_{dwell}$, $t_{slew}$ is a time to slew a line-of-sight from a current location to the next potential location, and $t_{dwell}$ is a time line-of-sight dwells at the next potential location.

2. The flight path clearing system of claim 1, wherein the number of characteristics of the laser beam comprises at least one of a wavelength, a focal length, a power, a timing, or an intensity.

3. The flight path clearing system of claim 2, wherein the focal length is selected such that the laser beam scans the area at a distance from the aircraft that enables the laser beam to effectively clear the flight path.

4. The flight path clearing system of claim 2, wherein the timing is selected from a group comprising pulsed and continuous.

5. The flight path clearing system of claim 1, wherein the laser beam system is selected from at least one of a gas laser beam system or a carbon dioxide laser beam system.

6. The flight path clearing system of claim 1, wherein the object type is an aerial drone.

7. The flight path clearing system of claim 1, wherein the controller is further configured to control a movement of the laser beam to comprise at least one of continuous movement or dwell time at each location in the sequence of locations.

8. The flight path clearing system of claim 1, wherein clearing an aerial drone as the number of objects from the flight path comprises causing at least one of interference with a navigation system of the aerial drone, the aerial drone to fly outside of the flight path of the aircraft, damage to the aerial drone, or destruction of the aerial drone such that the aerial drone moves away from the flight path of the aircraft.

9. The flight path clearing system of claim 1, wherein a shape of the pattern comprises one of: a hexagon, a honeycomb, a pentagon, and an octagon.

10. A flight path clearing system comprising:
a laser beam system in an aircraft; and
a controller configured to:
select a number of characteristics for a laser beam based on an object type; and control the laser beam system to:
emit the laser beam with the number of characteristics in a direction relative to a flight path of the aircraft; and
move the laser beam with the number of characteristics selected for the object type to scan an area using a pattern that is based on a sequence of locations in the pattern that are selected based on a scan metric, wherein a number of objects of the object type hit by the laser beam is cleared from the flight path, wherein the scan metric is $M = PDF_{int}/t_{tot}$, where $PDF_{int}$ is a probability density function integrated over an area of interest for a next potential location and $t_{tot}$ is a total time $t_{tot} = t_{slew} + t_{dwell}$, $t_{slew}$ is a time to slew a line-of-sight from a current location to the next potential location, and $t_{dwell}$ is a time line-of-sight dwells at the next potential location.

11. The flight path clearing system of claim 10, wherein the pattern is selected from a group comprising a hexagon, a honeycomb, a pentagon, and an octagon.

12. A method for clearing a flight path, the method comprising:
selecting a number of characteristics for a laser beam based on an object type, and
emitting the laser beam from an aircraft with the number of characteristics in a direction relative to the flight path of the aircraft; and
moving the laser beam with the number of characteristics selected for the object type to scan an area using a pattern that is based on a sequence of locations in the pattern being selected from a group that consists of the sequence of locations being:
nearest to a center of the area, wherein a number of objects of the object type hit by the laser beam is cleared from the flight path; and
selected based on a scan metric, wherein a number of objects of the object type hit by the laser beam is cleared from the flight path, wherein the scan metric is $$M = PDF_{int}/t_{tot}$$

where $PDF_{int}$ is a probability density function integrated over an area of interest for a next potential location and $t_{tot}$ is a total time $t_{tot} = t_{dwell}$, $t_{slew}$ is a time to slew a line-of-sight from a current location to the next potential location, and $t_{dwell}$ is a time line-of-sight dwells at the next potential location.

13. The method of claim 12, wherein the number of characteristics of the laser beam comprises at least one of a wavelength, a focal length, a power, a timing, or an intensity.

14. The method of claim 13, wherein the focal length is selected such that the laser beam scans the area at a distance from the aircraft that enables the laser beam to effectively clear the flight path.

15. The method of claim 13 wherein the timing is selected from a group comprising pulsed and continuous.

16. The method of claim 12, wherein the laser beam is emitted from a laser beam system selected from at least one of a gas laser beam system or a carbon dioxide laser beam system.

17. The method of claim 12, wherein the object type is an aerial drone.

18. The method of claim 12, wherein moving the laser beam comprises at least one of continuous movement or dwell time at each location in the sequence of locations.

19. The method of claim 12, wherein clearing an aerial drone as the number of objects from the flight path comprises causing at least one of interference with a navigation system of the aerial drone, the aerial drone to fly outside of the flight path of the aircraft, damage to the aerial drone, or destruction of the aerial drone such that the aerial drone moves away from the flight path of the aircraft.

20. The method of claim 12, wherein a shape of the pattern comprises one of: a hexagon, a honeycomb, a pentagon, and an octagon.

\* \* \* \* \*